US 6,695,121 B2

(12) United States Patent
Kawashima et al.

(10) Patent No.: US 6,695,121 B2
(45) Date of Patent: *Feb. 24, 2004

(54) DUSTPROOF LINEAR ACTUATOR WITH AN AIR VENTING DEVICE

(75) Inventors: Sosuke Kawashima, Gunma (JP); Nobuhito Saji, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/372,843

(22) Filed: Feb. 26, 2003

(65) Prior Publication Data

US 2003/0121759 A1 Jul. 3, 2003

Related U.S. Application Data

(62) Division of application No. 09/661,549, filed on Sep. 14, 2000, now Pat. No. 6,571,932, which is a continuation of application No. 08/634,413, filed on Apr. 18, 1996, now abandoned.

(30) Foreign Application Priority Data

Apr. 18, 1995 (JP) ................................................ 7-92694

(51) Int. Cl.⁷ ................................................ B65G 45/00
(52) U.S. Cl. ................................................ 198/494
(58) Field of Search ................................................ 198/494

(56) References Cited

U.S. PATENT DOCUMENTS 2,410,611 A   11/1946   Pratt et al.
4,545,290 A   10/1985   Lieberman
4,821,866 A    4/1989   Melgaard
6,571,932 B1 *  6/2003   Kawashima et al. ........ 198/494

FOREIGN PATENT DOCUMENTS

| JP | 62-124896 A | 6/1987 |
| JP | 63-119521 U | 8/1988 |
| JP | 2-253039 A | 10/1990 |
| JP | 5-29829 | 7/1993 |
| JP | 6-20898 | 1/1994 |

* cited by examiner

Primary Examiner—Joseph E. Valenza
(74) Attorney, Agent, or Firm—Sughrue Mion, PLLC

(57) ABSTRACT

A dustproof linear actuator has: a housing with a slit extending axially; a linear guide device disposed in the housing; a carriage mounted in the housing and axially movable along the slit by the linear guide device, the carriage including a workpiece mounting table protruding from the housing through the slit; a linear drive device disposed in the housing for moving the carriage axially; a pair of pulleys disposed in an axial end of the housing; and a sealing band mounted around the pulleys within the housing movably for closing the slit, the sealing band including first and second ends which are fastened to first and second ends of the carriage, respectively, to form a circulative loop. Further, the dustproof linear actuator has an air venting device for venting air existing in the housing close to the axial end toward an outside of the housing so that the dustproof linear actuator can remarkably prevents the dust particles from leaking out of the housing by reducing the pressure inside the actuator.

9 Claims, 4 Drawing Sheets

DUSTPROOF LINEAR ACTUATOR WITH AN AIR VENTING DEVICE

This is a divisional of Application No. 09/661,549 filed Sep. 14, 2000; now U.S. Pat. No. 6,571,932 which is a continuation of Application No. 08/634,413, filed Apr. 18, 1996 now abandoned, the disclosure of which is incorporated herein by reference.

BACKGROUND OF THE INVENTION

The present invention relates to a dustproof linear actuator adequate for use inside a clean room.

An example of the conventional dustproof linear actuator is disclosed in Unexamined Japanese Utility Model Publication No. Hei. 7-7837. The linear actuator includes a linear guide device disposed within a housing shaped in a long box, a carriage guided by the linear guide device, and a linear drive device for driving the carriage in the axial direction by a ball screw device. A slit which extends in the moving direction of the carriage is formed in the upper surface of the housing. The head portion of the carriage passes through the slit to protrude from the housing to an external. A neck portion of the carriage, located in the slit, connects the carriage to its head portion. The carriage transports an object to be transported in a state that the object is mounted on the head portion thereof.

Where the slit is left open, dust particles freely enter the housing and exit therefrom through the slit. To prevent the free movement of the dust particles, the linear actuator includes pulleys which are disposed close to both ends of the housing and a looped sealing band which is firmly attached to the fore and the read sides of the carriage. The looped sealing band is circulatively turned along the pulleys in accordance with the linear movement of the carriage. The sealing band tightly closes an opening defining the slit.

Where the linear actuator of the dust-proof type is used as a transporting device inside a clean room, it needs to prevent the dust particles within the linear actuator from leaking toward the external so that the clean room is polluted. It has been desired that the linear actuator should be further improved for the dust proof.

SUMMARY OF THE INVENTION

The present invention has been accomplished under conventional circumstances and has an object of providing a dustproof linear actuator which remarkably prevents the dust particles from leaking out of the housing by reducing the pressure inside the actuator.

To achieve the above object, there is provided a dustproof linear actuator having: a housing with a slit extending axially; a linear guide device disposed in the housing; a carriage mounted in the housing and axially movable along the slit by the linear guide device, the carriage including a workpiece mounting table protruding from the housing through the slit; a linear drive device disposed in the housing for moving the carriage axially; a pair of pulleys disposed in an axial end of the housing; and a sealing band mounted around the pulleys within the housing movably for closing the slit, the sealing band including first and second ends which are fastened to first and second ends of the carriage, respectively, to form a circulative loop. Further, the dustproof linear actuator has an air venting device for venting air existing in the housing close to the axial end toward an outside of the housing so that the dustproof linear actuator can remarkably prevents the dust particles from leaking out of the housing by reducing the pressure inside the actuator.

By sucking air from a space enclosed by the sealing band and the housing in the linear actuator, the inside of the linear actuator is kept at a negative pressure, to thereby prevent the dust particles from being scattered outside. Particularly, when the carriage is moved to the end of the housing, air in the housing is compressed by the moving carriage so that the pressure is increased. Under this condition, the dust particles tend to release outside the actuator. However, the present invention successfully solves the problem of the pressure increase by locating the openings for sucking air from the actuator near to both ends of the housing.

DETAILED DESCRIPTION OF THE PREFERRED EMBODIMENTS

Figure 1:
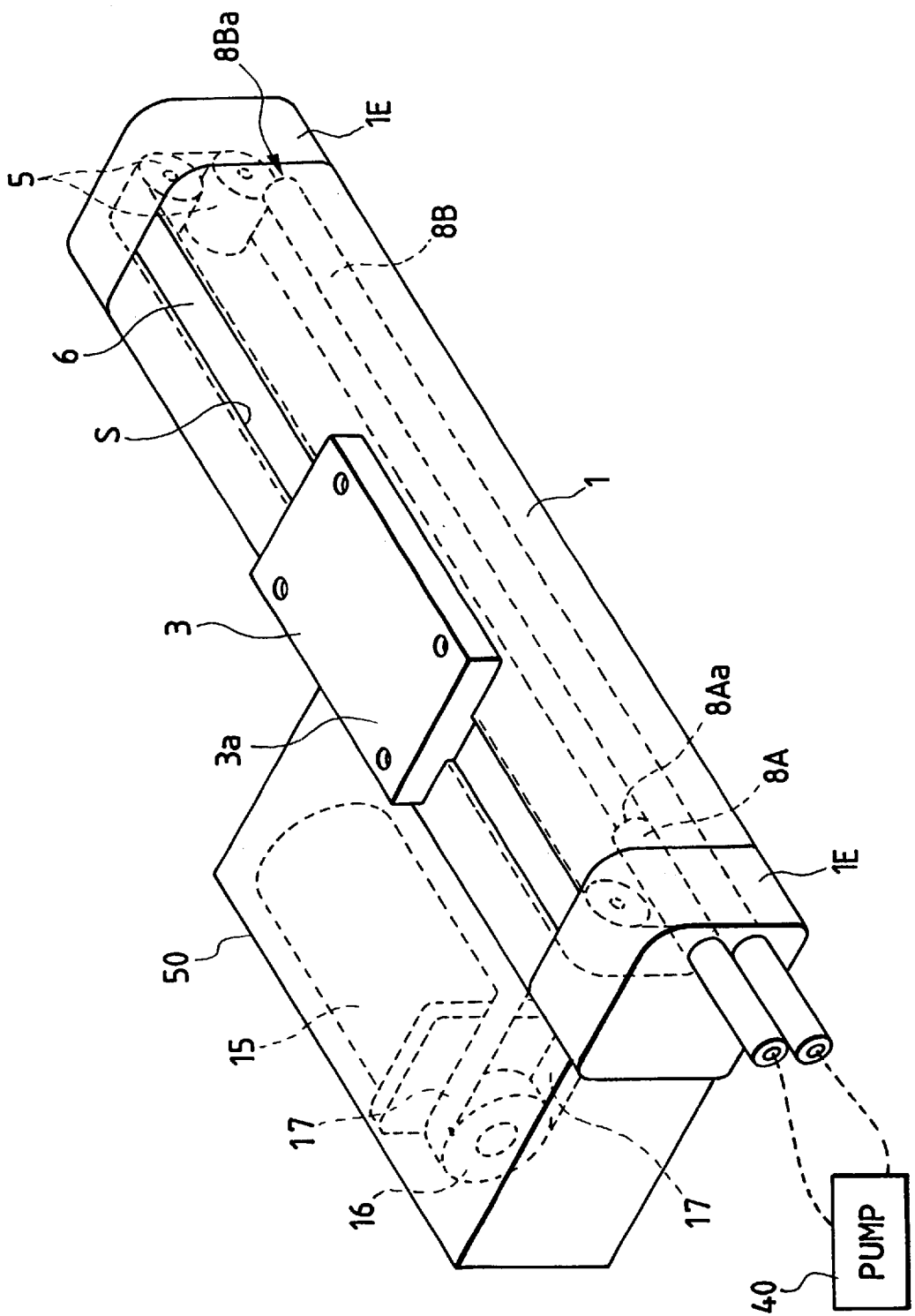
FIG. 1 is a perspective view showing an overall construction of a dustproof linear actuator, which is a first embodiment of the present invention.

The preferred embodiments of the present invention will be described with reference to the accompanying drawings. Throughout the drawings, like or equivalent portions are designated by like reference numerals and characters, for simplicity.

Figure 2:
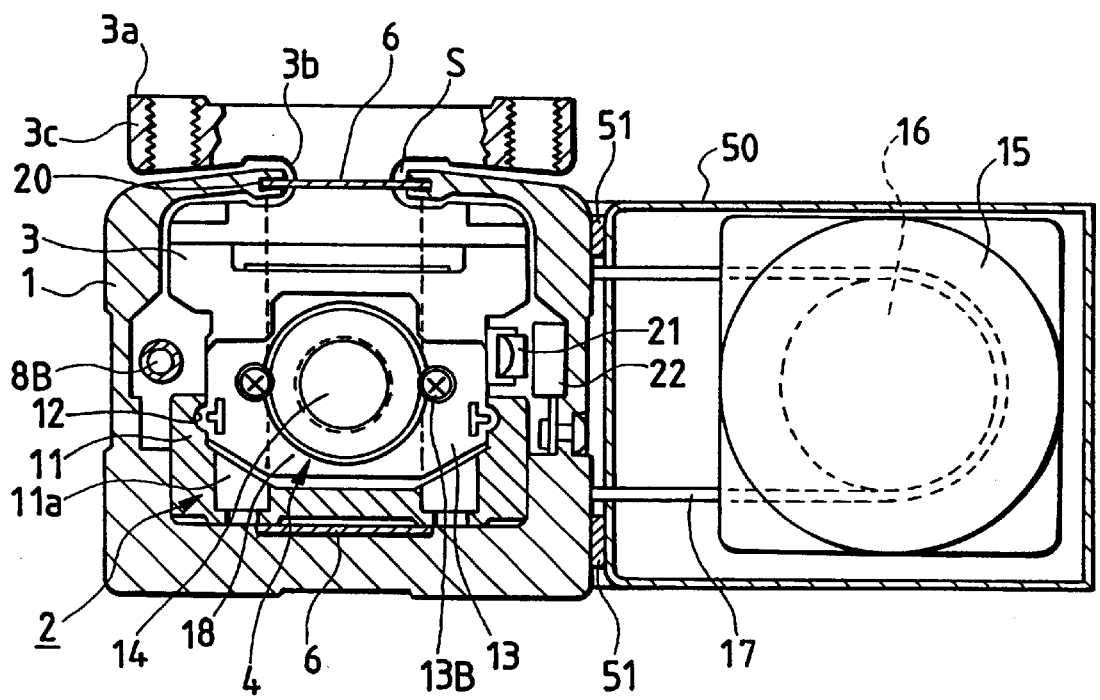
FIG. 2 is a cross sectional view of the linear actuator.
Figure 3:
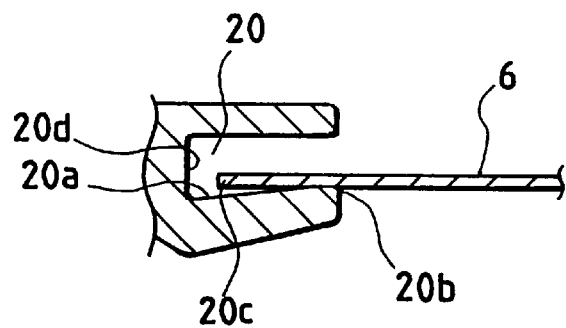
FIG. 3 is a cross sectional view showing a sealing band guide groove of the linear actuator.

In a first embodiment of the present invention as shown in FIGS. 1 to 3, a housing 1 is formed in a box shape extending axially. The housing 1 includes a bottom surface, a top surface and side surfaces which are molded integrally by an extrusion. Both ends of the housing 1 are covered with end covers 1E, respectively. A slit S extending longitudinally is formed in the top surface of the housing 1. A linear guide device 2, a carriage 3, and a ball screw device 4 are disposed within the housing 1. The carriage 3 is linearly reciprocated while being guided by the linear guide device 2. The ball screw device 4 serves as a driving machine for driving the carriage 3. A part of the carriage 3 extends through the slit S from the housing 1 so that the part forms a workpiece mounting table 3a.

Within the housing 1, a pair of pulleys 5, totally four pulleys, are located at both ends of the housing when viewed in the axial direction. One end of a sealing band 6 is fastened to one end of the carriage 3. The sealing band 6 extends extended toward the pulleys 5 located at one end of the housing 1, and turned back at the pulleys 5. The sealing band 6 further extends toward the pulleys 5 at the other end of the housing, and turned back. Then the sealing band 6 extends toward the carriage 3, and the other end of the sealing band 6 is fastened to the other end of the carriage 3. As a result, a movable loop of the sealing band 6 is formed. The slit S is sealed with the movable loop of the sealing band 6. Each of the pulleys 5 is shaped in a barrel so that a central part of the pulley (when viewed in its longitudinal direction) is the largest in diameter and the diameter of the central part is gradually reduced toward both ends of the pulley. The sealing band 6 is a flat band made of canvas impregnated with polyurethan, steel or plastic material.

Thus, the inside of the housing 1 is shut out from the outside thereof with the sealing band 6. A pair of air venting pipes 8A and 8B are disposed in the housing 1 and extend axially to pass through the end cover 1E toward the outside to act as venting air out of the housing 1. The air venting pipes 8A and 8B have a different length from each other. The short air venting pipe 8A extends internally and has an opening 8Aa located closer to one end of the housing 1. On the other hand, the long air venting pipe 8B extends internally and has an opening 8Ba located closer to the other end of the housing 1. The air venting pipes 8A and 8B are connected to a common exhausting pump 40 arranged outside the housing 1. Instead of the air venting pipe 8B extending internally, the air venting pipe 8B may extend externally around the housing 1 from the exhausting pump 40 so that the air venting pipe 8B can have an opening 8Ba passing through the end cover 1E at the other end of the housing 1 into the inside of the housing 1.

Within the housing 1, a guide rail 11 of the linear guide device 2 is disposed on the floor of the housing 1 and extends axially. The guide rail 11 is U-shaped with the top being opened. The guide rail 11 is fastened to the housing by a bolt (not shown) inserted into a bolt hole 11a. A pair of ball rolling grooves 12 are formed in inner sides of the U-shaped guide rail 11 and extends axially facing each other.

A screw shaft 14 of the ball screw device 4 is located at the center of the housing 1 when viewed in cross section, while axially extending within the housing 1. The screw shaft 14 is rotatably supported at both ends thereof by bearings mounted on the housing floor. A timing pulley (not shown) which is fastened to the end of the screw shaft, and a timing pulley 16 which is fastened to a drive motor 15, are coupled with each other by a timing belt 17 in a reversely rotatable manner. The drive motor 15 and the timing pulley 16 are enclosed with a motor cover 50. A joint portion between the housing 1 and the motor cover 50 is hermetically sealed with a packing 51.

A nut 18 of the ball screw device is fitted to the screw shaft 14 through a plurality of balls (not shown) inserted therebetween and serves also as a slider of the linear guide device 2 in the first embodiment. The nut 18 is fit into a U-shaped space within the guide rail 11 so that the nut is axially movable. The nut 18 includes ball rolling grooves (not shown) which are respectively formed in the right and the left side surfaces of the nut 18 so that the grooves face the ball rolling grooves 12 of the right and the left inner walls of the guide rail 11, respectively. The ball screw device is fitted with the guide rail 11, through a plurality of balls (not shown) rolling in ball rolling paths formed of the facing ball rolling grooves. The nut 18 includes through-holes (not shown) serving as ball circulating paths which are formed in the right and the left side thick portions of the nut 18 and extend in parallel with the ball rolling grooves in the side surfaces of the nut. Further, curved ball grooves (not shown) are respectively formed in end covers 13 fastened to the end faces of the nut 18 by bolts 13B so that the ball circulating paths connect the ball circulating paths with the ball rolling grooves in the side surfaces of the nut, respectively. Thus the ball rolling grooves, the ball circulating paths, and the curved ball grooves form endless circulating paths, respectively in that a plurality of balls (not shown) are installed rollingly. In cooperation with the rolling movement of the balls in the endless circulating paths, the nut 18 of the ball screw device linearly and smoothly moves while being guided by the guide rail 11.

The carriage 3 is fixedly mounted on the upper surface of the nut 18. The carriage 3 includes a neck portion 3b and a top plate 3c which projects over the housing 1, through the neck portion 3b made narrower than the width of the opening defining the slit S.

Both side edges of the sealing band 6 which tightly closes the slit S engage sealing grooves 20 that are formed in the end faces of the slit S in order to improve the sealing performance. The sealing groove 20 includes a bottom face 20a which is tapered down toward the inner side of the sealing groove from the outer side thereof, as shown in FIG. 3. An outer edge of the bottom face 20a serves as a slide portion 20b for the sealing band 6. A wedge-like space 20c is formed in cross section between the lower side of the sealing band 6 and the bottom face 20a.

A magnet 21 is mounted on the lower side wall of the carriage 3. A magnetic sensor 22 such as a Hall element is mounted on the inner wall of the housing 1 facing the magnetic sensor 21. The combination of the magnet 21 and the magnetic sensor 22 detects an original point in the linear motion of the carriage 3. The rotation of the drive motor 15 such as an AC servo motor is controlled on the basis of the detected original position to secure an accurate positioning of the linear actuator in the linear motion.

The operation of the thus constructed linear actuator of the first embodiment of the present invention will be described.

A workpiece as a member to be carried is fastened to the workpiece mounting table 3a of the carriage 3 which projects over the housing 1.

The single exhausting pump 40 which is connected to the air venting pipes 8A and 8B is driven to vent air from the inside of the housing 1, to thereby set a negative pressure in the housing 1. In this state, the drive motor 15 is driven. A rotation force generated by the drive motor is transmitted to the ball screw device 4 through the timing belt 17, to thereby rotate the screw shaft 14. With the rotation of the screw shaft, the nut 18 is moved in the axial direction. At the same time, the carriage 3 which is fastened to the nut 18 is moved axially so that the workpiece is carried. During the movement, the nut 18 also serving as a slider for the linear guide device 2 is guided by the guide rail 11 to insure a smooth movement of the carriage 3. Then, a precise linear motion of the workpiece is secured.

The looped sealing band 6 that tightly closes the opening of the slit S also moves in accordance with the movement of the carriage 3. It is assumed that the carriage 3 is moved to the left in FIG. 1. The sealing band 6 moves toward both the pulleys 5 located at the left end (when viewed in the drawing) of the housing and turns back at the pulleys 5. Then the sealing band 6 moves toward both the pulleys 5 located at the right end of the housing and again turned back at the pulleys 5. As a result, the looped sealing band 6 is circulated counterclockwise in FIG. 1. During the circulation, both side edges of the sealing band 6 which engage the sealing groove 20 of the slit, move in contact with the slide portions 20b of the bottom face 20a, to thereby tightly close the slit. The barrel-shaped pulleys 5 have a self-aligning function of effectively preventing the sealing band 6 from shifting sideways. Therefore, the sealing band 6 is secured that both sides thereof do not contact a vertical wall 20d of the sealing groove 20.

Where the workpiece is carried in the ball screw device 4, abrasion metal powder and lubricant grease particles are scattered because the balls made of hard steel move spirally along and rollingly between the facing ball screw grooves of the screw shaft 14 and the nut 18. In the linear guide device 2, the movement of the steel balls along and between the facing ball rolling grooves 12 of the guide rail 11 and the nut 18 also causes that the abrasion metal powder and lubricant grease particles are scattered. In addition, the slide portion 20b where the bottom face 20a of the sealing groove slidably contacts the sealing band 6 also generates the abrasion powder.

According to the first embodiment, the dustproof linear actuator almost completely leaves the dust particles within the housing 1, and hence remarkably prevents dust particles from being scattered outside the actuator (that is, into the clean room). The reason is because the pressure within the housing 1 is kept to be negative by the exhausting pump 40. Therefore, the difference between the pressures inside and outside the housing causes the sealing band 6 to press against the slide portion 20b of the bottom face 20a of the sealing groove. In addition, the wedge-shaped space 20c between the tapered bottom face 20a and the lower side of the sealing band 6 forms an extremely narrow air path, so that a rapid air flows toward the slide portion 20b. Accordingly, most of the dust particles are left within the housing 1. The dust particles are prevented from being scattered outside the housing.

Further, in the first embodiment, the bottom face 20a of the sealing groove is tapered and brought into linear contact with the lower side of the sealing band 6, to thereby form an extremely small sealing clearance. Therefore, it is enough to supply sucking air of an extremely small amount. This results in the reduction of the displacement of the exhausting pump 40 and the power cost for generating a negative pressure, and the facilitation of the layout of the exhausting pipes.

According to an experiment conducted by the inventors on condition that the carriage 3 is moved at the velocity of 3 m/min while air is exhausted at 25 N·l/min from the housing through the air venting pipes 8A and 8B, it has been confirmed that only 8 pieces of dust particles per one cubic feet are scattered outside the housing. In the experiment, the wedge-shaped space 20c of the sealing groove is 0.3 mm at maximum, and the velocity of air flowing therethrough is 55 cm/sec.

When the moving velocity of the carriage 3 is increased, the air existing in a space on the fore side of the carriage 3 (when viewed in the carriage moving direction) within the housing 1 is compressed by the carriage 3 and the nut 18. In this case, the negative pressure within the housing could not possibly be kept. However, according to the first embodiment, the air venting pipes 8A and 8B are both connected to the common exhausting pump 40. Therefore, when a pressure in a first space on the side of the air venting pipe 8A with respect to the carriage 3 is increased, a negative pressure in a second space on the side of the air venting pipe 8B is increased, so that the amount of sucking air is increased in the first space. For this reason, there is less possibility that the difference in pressure is created between the spaces on both sides of the carriage 3.

Further, according to the first embodiment, a weight of the workpiece loaded on the workpiece mounting table 3a of the carriage 3 is supported on the axial line of the linear guide device 2 where it is the most advantageous in view of the rigidity. A high rigidity required for the linear actuator is secured.

Moreover, the nut 18 of the ball screw device 4 serves also as the slider of the linear guide device 2. This contributes to the reduction of size and weight of the linear actuator.

A second embodiment of the present invention will be described with reference to FIGS. 4 and 5.

A linear actuator of the second embodiment is designed for carrying a large workpiece of heavy weight. Within the housing 1, a pair of linear guide device 2 are disposed in parallel with both sides of the housing 1. Two sliders 10 are mounted on the guide rail 11 of each of the linear guide device 2. A total of four sliders 10 cooperate to support a large carriage 3.

A ball screw device 4 for transporting the carriage 3 is disposed between the two linear guide device 2. One end of a screw shaft 14 is supported by one of end covers 1E through a bearing. Similarly, the other end of the screw shaft 14 is supported by the other end cover 1E through a bearing and extends out of the housing to couple the output shaft of a drive motor (not shown). A nut 18 into which the screw shaft 14 is screwed is fitted to the central part of the lower surface of the carriage 3 to thereby couple the carriage 3 with the ball screw device 4.

Protruded portions 25 are formed on both the sides of the carriage 3 when viewed in the direction of the width thereof, and upwardly protruded from the upper surface of the carriage 3 through slits S of a housing cover 1a of the housing 1. Each of the protruded portions 25 is narrow in width but equal in length to the carriage 3, and has a screw hole 25a into which a workpiece mounting screw is inserted. The upper surfaces of the protruded portions 25 serve as workpiece mounting tables 3a, respectively. In the second embodiment, two slits S are formed in association with the two protruded portions 25 for the carriage 3.

Closed spaces 26 are formed in the thick floor part of the housing 1 right under the guide rails 11, respectively. The closed spaces 26 are defined by which through-holes extending axially are closed with the end covers 1E. The closed spaces 26 are square in cross section in the second embodiment. Holes 27a and 27b are formed in both end parts of each of the closed spaces 26 when viewed in their longitudinal direction. The closed spaces 26 communicate with the inner space of the housing 1 through only the holes 27a and 27b thereof. Each of the closed spaces 26 contains a piston 28 slidably inserted therein. The piston 28 divides the closed space 26 into fore and rear spaces 26a and 26b. A pair of air venting ports 8Aa and 8Ba which are opened near both ends of the closed space 26, totally four ports, are formed to pass through both the sides of the housing 1 toward the closed spaces 26 in order to suck air from the fore and the rear spaces 26a and 26b, respectively. The air venting ports 8Aa and 8Ba may be formed such as the air venting pipes 8A employed in the first embodiment.

In the second embodiment, a pair of looped sealing bands 6 are provided in two rows movably to seal openings of both the slits S. Each of the looped sealing bands 6 is circulatively mounted over the pulleys 5 and divided into two bands 6L and 6R which are equal in length. The left sealing band 6L (when viewed in FIG. 4) includes one end fastened to the left end face 25L of the protruded portion 25 of the carriage 3 and the other end of the left sealing band 6L fastened to the left end face 28L of the piston 28 inside the closed space 26 so that the left sealing band 6L turns back at the upper and the lower pulleys 5 which are mounted on the left end covers 1E. Similarly, the right sealing band 6R also includes one end fastened to the right end face 25R of the protruded portion 25 of the carriage 3 and the other end fastened to the right end face 28R of the piston 28 inside the closed space so that the right sealing band 6R turns back at the upper and the lower pulleys 5 which are mounted on the right end covers 1E. The left sealing band 6L, the right sealing band 6R and the piston 28 cooperate to form a circulatively rotatable loop of the respective sealing bands 6.

The remaining construction of the second embodiment is substantially the same as of the first embodiment.

It is assumed now that the carriage 3 is positioned at the center of the housing 1 when longitudinally seen. At the same time, the piston 28 is positioned at the center of each of the closed spaces 26 when longitudinally seen. The carriage 3 starts to move to the right in FIG. 4, so that the piston 28 starts to move in the reverse direction. In this state, air existing in the space on the fore side of the carriage 3 (when viewed in the carriage moving direction) within the housing 1 flows through the hole 27b and reaches the closed space 26b. Then, the air is sucked through the suction port 8Ba to the air venting pipe (not shown). Air existing in the space on the fore side (left side) of the piston 28 when viewed in its moving direction is sucked through the suction port 8Aa to the air venting pipe 8A. The air also flows through the hole 27a into the space on the rear side of the carriage 3 in which the pressure is reduced by the movement of the carriage 3. As a result, the dust particles generated in the actuator are completely left within the housing 1, and hence cannot be released outside the housing 1 (into the clean room).

Figure 4:
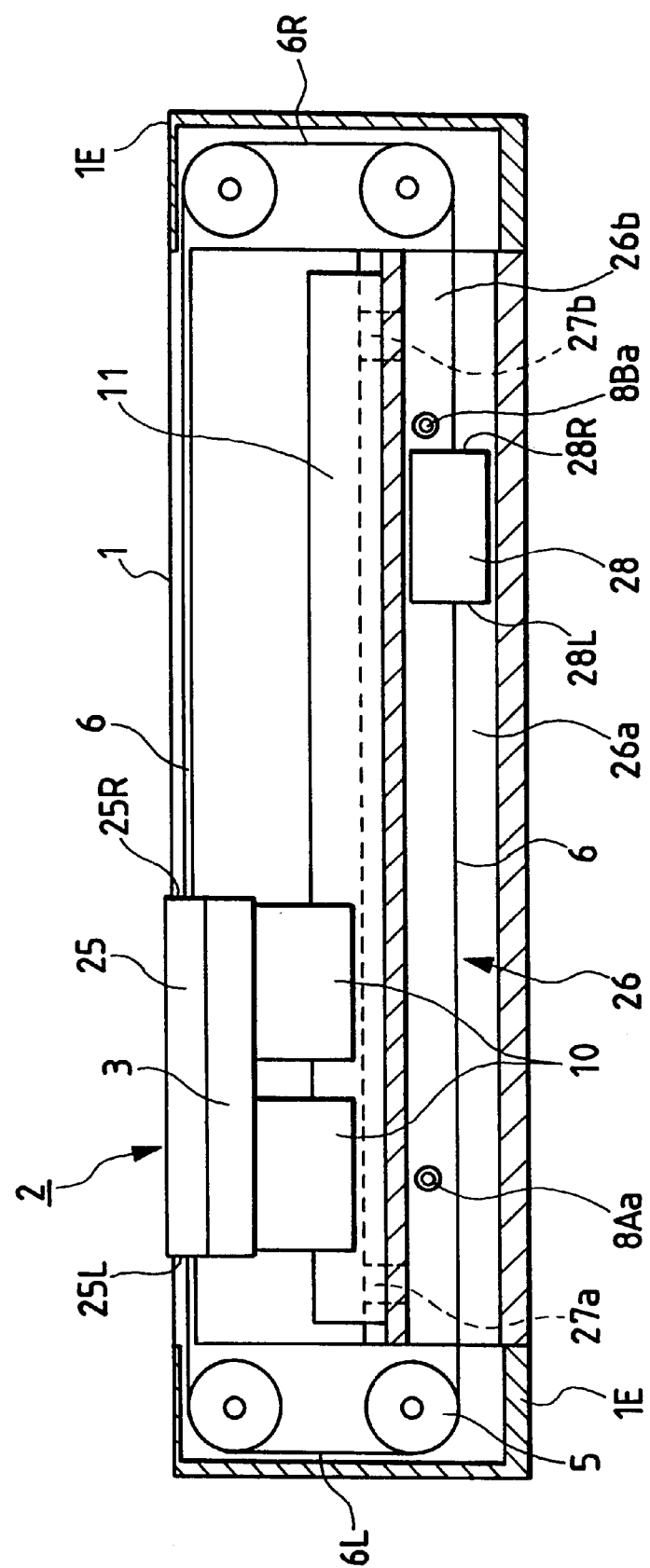
FIG. 4 is a longitudinal sectional view showing a dustproof linear actuator, which is a second embodiment of the present invention.
Figure 5:
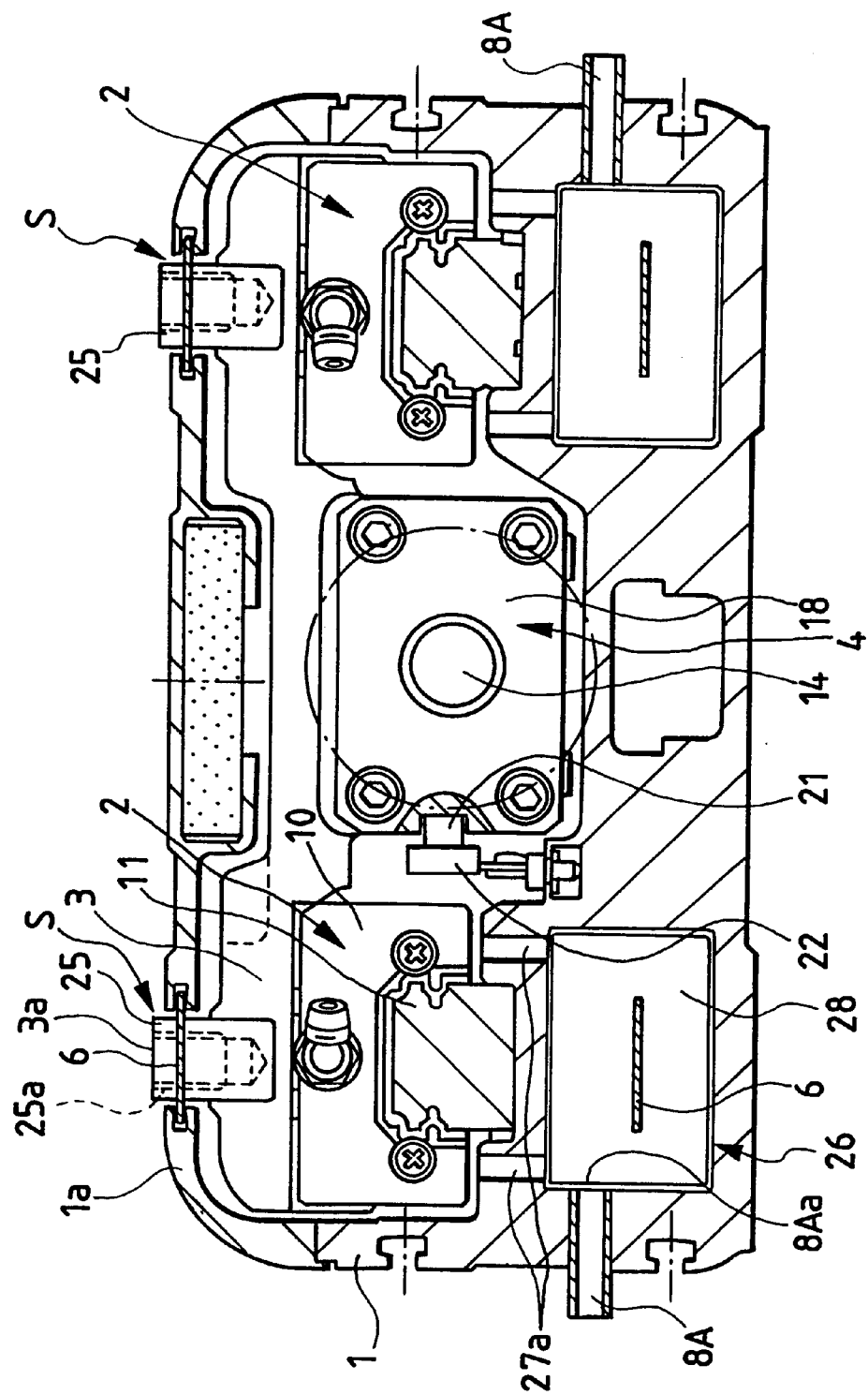
FIG. 5 is a cross sectional view showing the linear actuator in the second embodiment.

When the carriage 3 is moved at high velocity to the right in FIG. 4, the space existing on the fore side of the carriage 3 when viewed in the moving direction is compressed by the movement of the carriage 3. However, since the piston 28 moves at high velocity to the left in the closed spaces 26, the right closed space 26b rapidly expands in volume, so that the pressure therein is reduced. Therefore, the compressed air on the front side of the carriage flows through the hole 27b into the right closed space 26b. The flow lessens increasing the pressure of the air existing on the front side of the carriage, to thereby effectively prevent the dust particles from being released outside through the sealing band 6.

When the carriage 3 further moves to the right and approaches to the stroke end, the piston 28 closes the left suction port 8Aa, so that the amount of sucking air through the right suction port 8Ba is increased. This results in canceling out the pressure increase due to a rapid reduction of the volume of the air existing in the space on the front side of the carriage near the stroke end. No dust particles are scattered outside from the housing.

In the above-mentioned embodiments, the ball screw device 4 is employed as the linear drive device for driving the carriage 3. A linear motor may be employed instead of the ball screw device 4. The linear drive device of another type can be provided with teeth that are formed on the inner surface of the sealing band 6 (except the slide portion where it slidably contacts with the sealing groove 20) to engage the teeth of the timing pulley and pulleys 5 that are employed as the timing pulleys, in which a drive force of the drive motor 15 is transmitted to the sealing bands 6, to thereby move the carriage 3 linearly.

As described above, according to the dustproof linear actuator of the present invention, a part of the carriage which is movable in the axial direction within the actuator is exposed through a slit formed in the actuator. An opening of the slit is tightly closed with the rotatable loop of the sealing band. Air is constantly sucked from the housing through ports located near both ends of the housing (when axially seen) by the air venting device. With this construction, the inside of the linear actuator is kept at a negative pressure, to thereby prevent the dust particles from being scattered outside. Particularly, when the carriage is moved at high velocity to the end of the actuator, air pressure is increased at the end of the actuator. Under this condition, the dust particles tend to release outside the actuator. However, according to the present invention, the openings for sucking air from the actuator are located near both the ends of the housing. Therefore, the pressure increase is effectively lessened, to thereby prevent the dust particles from being scattered outside.

What is claimed is:

1. A dustproof linear actuator comprising:
    a housing, having a first axial end and a second axial end opposite to said first axial end, with a slit extending axially from said first axial end to said second axial end;
    a linear guide device disposed in the housing;
    a carriage mounted in the housing and axially movable along the slit by the linear guide device, the carriage including a workpiece mounting table protruding from the housing through the slit;
    a linear drive device disposed in the housing for moving the carriage axially, wherein when said linear drive device axially moves the carriage towards one of said first and second axial ends, air disposed between the carriage and said one of the ends within said housing is compressed so as to cause an increase in pressure thereof;
    a pair of pulleys disposed in an axial end of the housing;
    a sealing band movably mounted around the pulleys within the housing for closing the slit, the sealing band including first and second ends which are fastened to first and second ends of the carriage, respectively, to form a circulative loop; and
    an air venting device having openings, near said first axial end and said second axial end, for venting air existing in the housing to an outside of the housing,
    wherein the air venting device comprises first and second air venting pipes disposed in the housing and extending axially to pass through at least one housing end toward the outside of the housing, the first and second air venting pipes having a different length from each other in which the first air venting pipe includes an inner end which is opened close to the first axial end and the second air venting pipe includes an inner end which is opened close to the second axial end of the housing.

2. The dustproof linear actuator according to claim 1, wherein said openings of said air venting device are disposed only adjacent said first and second axial ends of said housing.

3. A dustproof linear actuator comprising:
    a housing, having a first axial end and a second axial end opposite to said first axial end, with a slit extending axially from said first axial end to said second axial end;
    a linear guide device disposed in the housing;
    a carriage mounted in the housing and axially movable along the slit by the linear guide device, the carriage including a workpiece mounting table protruding from the housing through the slit;
    a linear drive device disposed in the housing for moving the carriage axially, wherein when said linear drive device axially moves the carriage towards one of said first and second axial ends, air disposed between the carriage and said one of the ends within said housing is compressed so as to cause an increase in pressure thereof;
    a pair of pulleys disposed in an axial end of the housing;
    a sealing band movably mounted around the pulleys within the housing for closing the slit, the sealing band including first and second ends which are fastened to first and second ends of the carriage, respectively, to form a circulative loop; and an air venting device having openings, near said first axial end and said second axial end, for venting air existing in the housing to an outside of the housing, wherein the slit includes a sealing groove formed in a longitudinal face of the slit to engage a side edge of the sealing band, the sealing groove comprising a slide portion contacting the sealing band in a lower side thereof, a bottom face tapered down from the slide portion toward an inner side of the sealing groove, and a wedge-like space formed in cross section between the lower side of the sealing band and the bottom face.

4. The dustproof linear actuator according to claim 3, wherein said openings of said air venting device are disposed only adjacent said first and second axial ends of said housing.

5. A dustproof linear actuator comprising:

a housing, having a first axial end and a second axial end opposite to said first axial end, with a slit extending axially from said first axial end to said second axial end;

a linear guide device disposed in the housing;

a carriage mounted in the housing and axially movable along the slit by the linear guide device, the carriage including a workpiece mounting table protruding from the housing through the slit;

a linear drive device disposed in the housing for moving the carnage axially;

a pair of pulleys disposed in an axial end of the housing;

a sealing band movably mounted around the pulleys within the housing for closing the slit, the sealing band including first and second ends which are fastened to first and second ends of the carriage, respectively, to form a circulative loop; and an air venting device having openings, near said first axial end and said second axial end, for venting air existing in the housing to an outside of the housing, wherein the dustproof linear actuator comprises a pair of linear guide devices disposed in the housing in parallel with each other relative to a side of the housing, wherein each of the linear guide devices comprises a guide rail extending axially which is disposed on a floor of the housing and U-shaped with an open top, and a pair of sliders mounted on the guide rail to support the carriage in cooperation with each other, wherein the housing comprises a closed space formed between the floor of the housing and the guide rail and a hole communicating with an inner space of the housing in which the guide rail is disposed, and wherein the dustproof linear actuator comprises a piston slidably inserted within the closed space for dividing the closed space into fore and rear spaces, wherein when said linear drive device axially moves the carriage towards one of said first and second axial ends, at least one of said carriage and said piston compresses air disposed on a downstream side of its movement as to cause an increase in pressure thereof.

6. The dustproof linear actuator according to claim 5, wherein said openings of said air venting device are disposed only adjacent said first and second axial ends of said housing.

7. A dustproof linear actuator comprising:

a housing, having a first axial end and a second axial end opposite to said first axial end, with a slit extending axially from said first axial end to said second axial end;

a linear guide device disposed in the housing;

a carriage mounted in the housing and axially movable along the slit by the linear guide device, the carriage including a workpiece mounting table protruding from the housing through the slit;

a linear drive device disposed in the housing for moving the carriage axially;

a pair of pulleys disposed in an axial end of the housing;

a sealing band movably mounted around the pulleys within the housing for closing the slit, the sealing band including first and second ends which are fastened to first and second ends of the carriage, respectively, to form a circulative loop; and an air venting device having openings, near said first axial end and said second axial end, for venting air existing in the housing to an outside of the housing, wherein the dustproof linear actuator comprises a pair of linear guide devices disposed in the housing in parallel with each other relative to a side of the housing, wherein each of the linear guide devices comprises a guide rail extending axially which is disposed on a floor of the housing and U-shaped with an open top, and a pair of sliders mounted on the guide rail to support the carriage in cooperation with each other, wherein the housing comprises a closed space formed between the floor of the housing and the guide rail and a hole communicating with an inner space of the housing in which the guide rail is disposed, wherein the dustproof linear actuator comprises a piston slidably inserted within the closed space for dividing the closed space into fore and rear spaces, wherein when said linear drive device axially moves the carriage towards one of said first and second axial ends, at least one of said carriage and said piston compresses air disposed on a downstream side of its movement as to cause an increase in pressure thereof, and further wherein the sealing band comprises a pair of sealing band portions movably mounted around the pulleys within the housing for closing the slit, each of the sealing band portions including first and second ends which are fastened to the carriage and the piston, respectively.

8. The dustproof linear actuator according to claim 7, wherein said openings of said air venting device are disposed only adjacent said first and second axial ends of said housing.

9. The dustproof linear actuator according to claim 1, wherein said air venting device further comprises an exhausting pump connected to outer ends of said first and second air venting pipes.

* * * * *